(12) United States Patent
Lampes

(10) Patent No.: US 6,250,879 B1
(45) Date of Patent: Jun. 26, 2001

(54) BRUSH SEAL

(75) Inventor: Elias H. Lampes, Lynnfield, MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/418,717

(22) Filed: Oct. 15, 1999

(51) Int. Cl.[7] ............................................. F16J 15/447
(52) U.S. Cl. ........................ 415/174.2; 415/231; 227/355
(58) Field of Search ........................... 415/174.2, 174.5, 415/230, 231; 277/355

(56) References Cited

U.S. PATENT DOCUMENTS

| 5,192,084 | * | 3/1993 | Norbury | ................................. 277/53 |
| 5,318,309 | | 6/1994 | Tseng et al. | |
| 5,568,931 | | 10/1996 | Tseng et al. | |
| 5,597,167 | * | 1/1997 | Snyder et al. | ........................... 277/53 |
| 5,799,952 | * | 9/1998 | Morrison et al. | ..................... 277/355 |

* cited by examiner

Primary Examiner—Edward K. Look
Assistant Examiner—Liam McDowell
(74) Attorney, Agent, or Firm—Andrew C. Hess; Rodney M. Young

(57) ABSTRACT

A brush seal for sealing a leakage path located between a rotating member and a stationary member includes an intermediate plate attached to the stationary member and having at least one purge hole formed therein. The brush seal also includes a first end plate attached to the stationary member on one side of the intermediate plate and a second end plate attached to the stationary member on the other side of the intermediate plate. A first bristle pack is disposed between the first end plate and the intermediate plate, and a second bristle pack is disposed between the second end plate and the intermediate plate.

15 Claims, 2 Drawing Sheets

BRUSH SEAL

STATEMENT REGARDING FEDERALLY SPONSORED RESEARCH & DEVELOPMENT

The U.S. Government may have certain rights in this invention pursuant to contract number DAAH10-98--0023 awarded by the Department of Defense.

BACKGROUND OF THE INVENTION

This invention relates generally to brush seals and more particularly to a brush seal for a gas turbine engine.

A gas turbine engine operates according to well known principles wherein an incoming stream of atmospheric air flows through the engine along an axially extending flow path. At least a portion of the incoming air is compressed in a compressor section of the engine and then mixed with fuel and burned in a combustor section to produce a high energy, high temperature exhaust gas stream. The hot gas stream exits the combustor and subsequently passes through a turbine section that extracts energy from the exhaust gas stream to power the compressor and provide useful work such as powering an aircraft in flight.

Uncontrolled leakage of gases—such as atmospheric air, exhaust gases, or other—within the engine contributes to a reduced engine efficiency. Seals are used to control this energy loss by interposing them in a leakage path to reduce the volume or mass of gas passing from one part of the engine to another. Labyrinth seals have been commonly used in gas turbine engines for sealing between relatively movable components. However, the use of brush seals as a substitute for labyrinth seals is also known.

A conventional brush seal typically includes a plurality of similar or identical seal stages with each stage including a bristle pack having a plurality of bristles. The bristle pack of each stage is disposed between a front plate (i.e., a plate facing the higher pressure) and a back plate with adjacent stages being spaced apart a specified distance. The bristles usually are disposed at about a forty five degree angle to a radius drawn from the engine centerline. A brush seal is typically attached along its outer radial edge to a stationary engine part with the radially inner, free ends of the bristles disposed in a sealing engagement with a sealing surface on a rotating engine part. Brush seals are not intended to function so as to completely seal one engine section from another, but rather rely upon the tortuous flow path created between the bristles to reduce gas flow therethrough and to control the pressure drop between the engine sections. Typically, the leakage flow and pressure drop are in the same direction for each stage of the brush seal.

While the use of multiple stages improves the effectiveness of conventional brush seals, it can cause the brush seal to be come bulky and difficult to install in many engine locations. Furthermore, the large number of support plates required for multiple stages increases the cost and weight of the seal.

Accordingly, there is a need for a multi-stage brush seal for gas turbine engines that is relatively easy to install and uses fewer parts than conventional multi-stage brush seals.

SUMMARY OF THE INVENTION

The above-mentioned need is met by the present invention which provides a brush seal for sealing a leakage path located between a rotating member and a stationary member. The brush seal comprises an intermediate plate attached to the stationary member and having at least one purge hole formed therein. The brush seal also includes a first end plate attached to the stationary member on one side of the intermediate plate, and a second end plate attached to the stationary member on the other side of the intermediate plate. A first bristle pack is disposed between the first end plate and the intermediate plate, and a second bristle pack is disposed between the second end plate and the intermediate plate.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
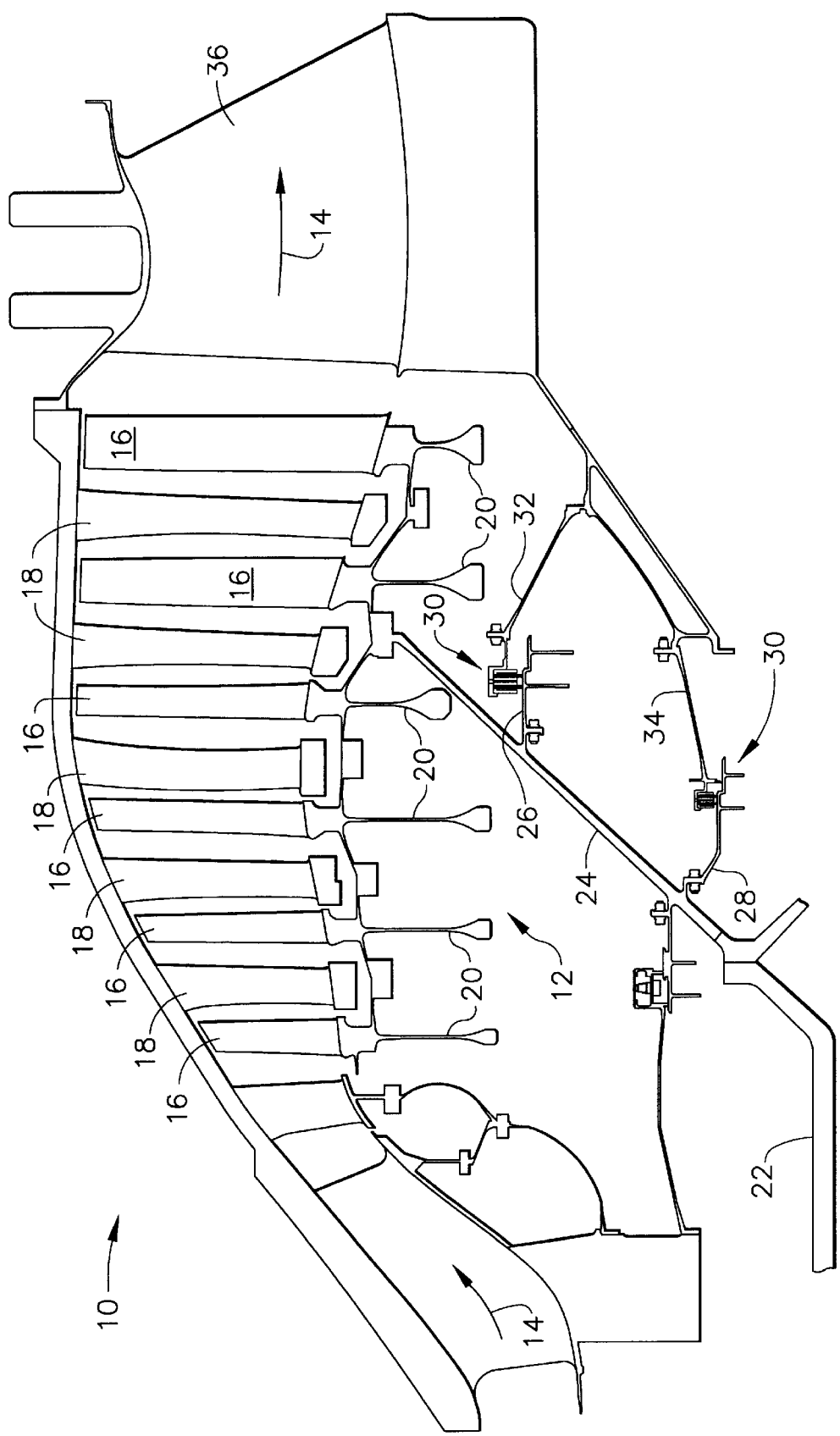
FIG. 1 is a partial cross-sectional view of the turbine section of a gas turbine engine and illustrates typical locations for the brush seal of the present invention.

Referring to the drawings wherein identical reference numerals denote the same elements throughout the various views, FIG. 1 shows a partial cross sectional view of a gas turbine engine 10 including a turbine section 12. As is well known, the turbine section 12, which could be either a high pressure turbine or a low pressure turbine (as shown), has a flow path through which a high energy gas stream flows downstream, as indicated by arrow 14. The turbine section 12 includes a plurality of circumferential rows of substantially radially directed turbine blades 16 interdigitated with one or more circumferential rows of substantially radially extending stator vanes 18. The turbine blades 16 of each row are mounted to a rotor disk 20. The rotor disks 20 are in turn rigidly connected to a rotating turbine shaft 22 via a turbine shaft cone 24 for rotation about the engine's centerline. Two rotating members 26 and 28 are rigidly attached to the turbine shaft cone 24 and extend downstream therefrom.

Two brush seals 30 are interposed between a respective one of the rotating members 26 and 28 and a corresponding stationary structural member 32 and 34, which are both rigidly affixed to a turbine rear frame 36. The rotating members 26 and 28 are generally cylindrical in form and are partially located within the corresponding one of the stationary members 32 and 34, which are also generally cylindrical in form.

As will be described in more detail below, each brush seal 30 comprises two stages, each stage including a plurality of bristles that extends from a fixed connection with the respective stationary member 32 and 34 to a sealing engagement with the corresponding rotating member 26 and 28. The brush seals 30 are positioned in the turbine section 12 so as to prevent undesired leakage of gases, such as cooling air at different pressures, from one cavity to another within the engine.

It should be noted that while the brush seal of the present invention is described herein relative to its use in the turbine section of a gas turbine engine, it is not limited to this application. Indeed, the brush seal of the present invention is can be used in many other applications within a gas turbine engine or elsewhere.

Figure 2:
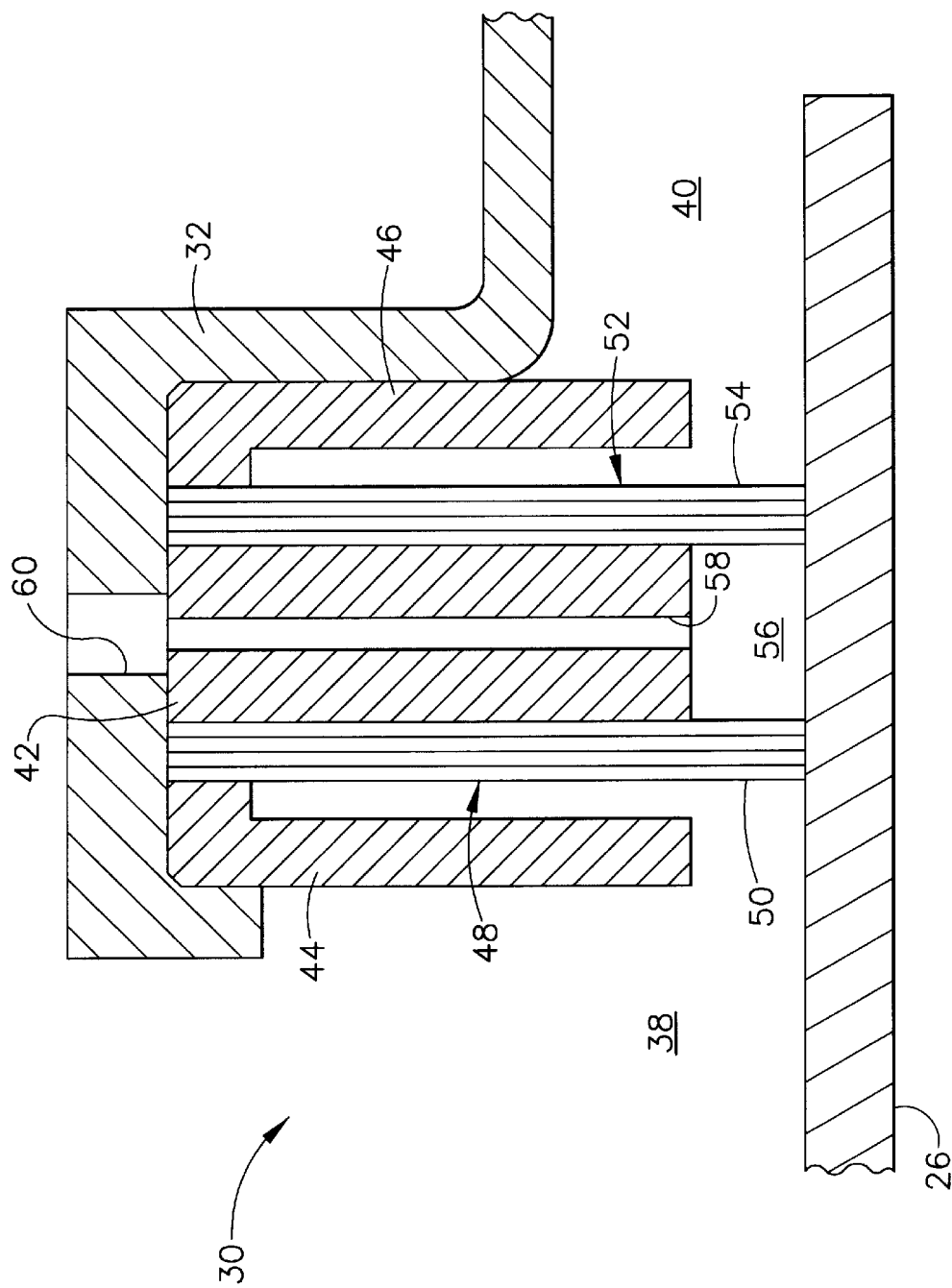
FIG. 2 is a detailed cross-sectional view of the brush seal of FIG. 1.

Turning now to FIG. 2, one preferred embodiment of the brush seal 30 of the present invention is shown in more detail. The brush seal 30 is disposed in an annular gap between the stationary member 32 and the rotating member 26. As mentioned above, both the stationary member 32 and the rotating member 26 are generally cylindrical in form, and the stationary member 32 surrounds the aft portion of the rotating member 26 so as to define the aforementioned annular gap. This gap forms a leakage path between a first cavity 38 and a second cavity 40.

The brush seal 30 includes an intermediate plate 42, a first end plate 44 located on a first, upstream side of the intermediate plate 42, and a second end plate 46 located on a second, downstream side of the intermediate plate 42. Each of these plates 42, 44 and 46 is an annularly configured plate attached at its respective radially outer circumferential edge to the stationary member 32. The inner circumferential edge of each plate 42, 44 and 46 surrounds the outer surface of the rotating member 26 and is spaced therefrom so as to not contact the rotating member 26.

A first bristle pack 48 having a plurality of bristles 50 is wedged between the intermediate plate 42 and the first end plate 44. The bristles 50 are arranged such that their radially outermost ends are secured to the stationary member 32 and their radially inner, free ends sealingly engage the outer surface of the rotating member 26. Similarly, a second bristle pack 52 having a plurality of bristles 54 is wedged between the intermediate plate 42 and the second end plate 46. The bristles 54 are also arranged such that their outermost ends are secured to the stationary member 32 and their inner, free ends sealingly engage the outer surface of the rotating member 26.

The brush seal 30 thus has two stages: a first, upstream stage comprising the first end plate 44 and the first bristle pack 48, and a second, downstream stage comprising the second end plate 46 and the second bristle pack 52. The two stages share the intermediate plate 42. An enclosed space 56 is formed between the first and second stages of the brush seal 30. The space 56 is an annular volume defined by the radially inner edge of the intermediate plate 42, the first and second bristle packs 48 and 52, and the outer surface of the rotating member 26.

The brush seal 30 further includes one or more purge holes 58 (only one shown in FIG. 2) formed in the intermediate plate 42 for purging from the space 56 any gas that leaks past either stage of the brush seal 30. Specifically, the purge holes 58 extend radially between the inner and outer circumferential edges of the intermediate plate 42. The purge holes 58 are aligned with corresponding passages 60 formed in the stationary member 32 so as to create fluid communication between the space 56 and the exterior of the brush seal 30. This purge flow from the space 56 can be dumped overboard or, more preferably, can be bypassed to one of the cavities 38 or 40 or to another portion of the engine for cooling purposes.

While the brush seal 30 reduces gas flow through the leakage path and controls the pressure drop between the first cavity 38 and the second cavity 40, like all brush seals, it does not completely seal the cavities 38 and 40. There is a small leakage flow through the bristles 50 and 54. However, unlike conventional brush seals in which the leakage flow and pressure drop are in the same direction for each stage, the leakage flow and pressure drop across the two stages of the brush seal 30 are in opposite axial directions because of the purge of the space 56 via the purge holes 58. Accordingly, the first and second end plates 44 and 46, which face the first and second cavities 38 and 40, respectively, each function in the manner of the front plate of a conventional brush seal for their respective stage, and the intermediate plate 42 functions as a common back plate for each stage.

The bristles of both bristle packs 48 and 52 can be made of any suitable material, such as metallic or ceramic materials. Ceramic bristles are particularly useful in the present invention because of their capability to withstand high temperatures. The bristles 50 and 54 are somewhat flexible and are thus able to withstand relative movement in the radial and axial directions that may occur during an engine transient and still retain their sealing ability after the transient has passed. Examples of such transients include differential thermal growth between engine parts, eccentric shaft rotation and engine vibrations. The intermediate plate 42 and the first and second end plates 44 and 46 are all preferably rigid plates, but, as discussed above, are adequately spaced from the rotating member 26 so as to avoid contact therewith during such transients.

The foregoing has described a multi-stage brush seal for gas turbine engines that is relatively easy to install and uses fewer supporting plates than conventional brush seals. While specific embodiments of the present invention have been described, it will be apparent to those skilled in the art that various modifications thereto can be made without departing from the spirit and scope of the invention as defined in the appended claims.

What is claimed is:

1. A brush seal for sealing a leakage path located between a rotating member and a stationary member, said brush seal comprising:

an intermediate plate attached to said stationary member, said intermediate plate having at least one purge hole formed therein;

a first end plate located on a first side of said intermediate plate and attached to said stationary member;

a second end plate located on a second side of said intermediate plate and attached to said stationary member;

a first bristle pack disposed between said first end plate and said intermediate plate; and a second bristle pack disposed between said second end plate and said intermediate plate.

2. The brush seal of claim 1 wherein said first bristle pack includes a plurality of bristles, said bristles having free ends that sealingly engage said rotating member.

3. The brush seal of claim 1 wherein said second bristle pack includes a plurality of bristles, said bristles having free ends that sealingly engage said rotating member.

4. The brush seal of claim 1 wherein said purge hole extends radially through said intermediate plate.

5. The brush seal of claim 1 wherein said intermediate plate, said first bristle pack, said second bristle pack and said rotating member define an enclosed space in said brush seal, said purge hole providing fluid communication between said space and the exterior of said brush seal.

6. The brush seal of claim 1 wherein said intermediate plate has a plurality of purge holes formed therein.

7. The brush seal of claim 1 wherein said intermediate plate does not contact said rotating member.

8. The brush seal of claim 1 wherein said first and second end plates do not contact said rotating member.

9. The brush seal of claim 1 wherein said first bristle pack has a flow therethrough in a first direction and said second bristle pack has a flow therethrough in a second direction, opposite to said first direction.

10. A brush seal for sealing a leakage path located between a rotating member and a stationary member of a gas turbine engine having an axial flow path and extending from a first cavity to a second cavity, said brush seal comprising:

- an intermediate plate attached to said stationary member, said intermediate plate having at least one radially extending purge hole formed therein;
- a first end plate located upstream of said intermediate plate, facing said first cavity, and attached to said stationary member;
- a second end plate located downstream of said intermediate plate, facing said second cavity, and attached to said stationary member;
- a first bristle pack disposed between said first end plate and said intermediate plate, said first bristle pack including a plurality of bristles, said bristles having free ends that sealingly engage said rotating member; and
- a second bristle pack disposed between said second end plate and said intermediate plate, said second bristle pack including a plurality of bristles, said bristles having free ends that sealingly engage said rotating member.

11. The brush seal of claim 10 wherein said intermediate plate, said first bristle pack, said second bristle pack and said rotating member define an enclosed space in said brush seal, said purge hole providing fluid communication between said space and the exterior of said brush seal.

12. The brush seal of claim 10 wherein said intermediate plate has a plurality of radially extending purge holes formed therein.

13. The brush seal of claim 10 wherein said intermediate plate does not contact said rotating member.

14. The brush seal of claim 10 wherein said first and second end plates do not contact said rotating member.

15. The brush seal of claim 10 wherein said first bristle pack has a flow therethrough in a first direction and said second bristle pack has a flow therethrough in a second direction, opposite to said first direction.

* * * * *